(12) United States Patent
Harper

(10) Patent No.: US 8,359,714 B2
(45) Date of Patent: Jan. 29, 2013

(54) HOIST LINE PROTECTOR

(76) Inventor: Grover Edward James Harper, Wildwood (CA)

(*) Notice: Subject to any disclaimer, the term of this patent is extended or adjusted under 35 U.S.C. 154(b) by 331 days.

(21) Appl. No.: 12/659,965

(22) Filed: Mar. 26, 2010

(65) Prior Publication Data

US 2011/0025082 A1   Feb. 3, 2011

(30) Foreign Application Priority Data

Aug. 3, 2009  (GB) .................................... 0913468.5

(51) Int. Cl.
*F16B 2/14* (2006.01)
(52) U.S. Cl. .................... 24/136 R; 24/115 R
(58) Field of Classification Search ...... 24/136 R–136 B, 24/115 M, 115 R, 129 R, 715.6; 187/411; 403/374.1, 211, 314; 294/102.1
See application file for complete search history.

(56) References Cited

U.S. PATENT DOCUMENTS

| | | | | |
|---|---|---|---|---|
| 5,553,360 A | * | 9/1996 | Lucas et al. ................. | 24/136 K |
| 5,938,469 A | * | 8/1999 | Ford et al. ..................... | 439/459 |
| 6,152,060 A | * | 11/2000 | Steiner ......................... | 114/219 |
| 6,898,827 B1 | * | 5/2005 | Postelwait et al. .......... | 24/136 L |

* cited by examiner

*Primary Examiner* — James Brittain
(74) *Attorney, Agent, or Firm* — Richard Okimaw

(57) ABSTRACT

Disclosed is an apparatus for enclosing the free distal end of a flexible tensile member supporting an object. The flexible tensile member has a first portion in tension for suspending the object therefrom and a free end substantially perpendicular thereto with the object therebetween. The apparatus comprises a body having a passage sized to slidably receive the first portion of the flexible tensile member therein a bottom edge adapted to engage the object and a void for enclosing the free distal end of the flexible tensile member wherein the bottom edge is engaged with the object.

13 Claims, 6 Drawing Sheets

HOIST LINE PROTECTOR

BACKGROUND OF THE INVENTION

1. Field of Invention

The present invention relates to cranes in general and in particular to a method and apparatus for protecting the free distal end of a crane hoist line.

2. Description of Related Art

Cranes lift objects by way of their hoist line. The distal end of a hoist line frequently has a hook, weighted ball or other object attached thereto. One conventional method of securing objects to the distal end of a hoist line is through the use of a socket and wedge assembly 12 as illustrated in FIG. 1. A socket and wedge assembly 12 is suspended from a wire rope 10 or cable. The wire rope 10 may also comprise any other known flexible tensile member. As illustrated in FIG. 1, the cable 10 has a first or load bearing portion 8 suspended from the crane (not shown) and a second portion 6 being a free distal end supporting a socket and wedge assembly 12 therebetween.

The socket and wedge assembly 12 has a socket body 18 having a load end 14 and a top end 16. The socket body 18 has an internal cavity 20 adapted to receive the wedge 26 and cable 10 therein. The cavity 20 extends between top and bottom openings, 22 and 24, respectively. Such a connection is created by threading the cable 10 into a top opening 22 of the cavity 20, looping it around the wedge 26, and then pulling the free distal end 6 of the cable 10 back up into the socket again as illustrated in FIG. 2. The wedge 26 may then be secured around the wire rope 10 by either pulling down on the socket body 18 or pushing the wedge upwardly into the cavity 20. A clip 28 or other securing method may be then utilized to secure the free distal end 6 cable to either a top portion of the wedge or to the load bearing portion 8 of the cable 10.

Socket and wedge connections are common and popular in many applications as they are relatively quick and easy to install. Other similar connectors for a cable or wire rope are also common in which an object is secure to the a location proximate to the end of cable. In many of these methods, the cable will be doubled back upon itself after connection to the object as illustrated in FIG. 1.

Problems currently exist with the above conventional socket and wedge assembly as illustrated in FIGS. 1 and 2. Specifically, permitting the free distal end 6 of cable 10 to remain free permits it to encounter debris and other objects upon which the crane operator is manipulating. In particular, when a headache is suspended from the load end 14 of the socket and wedge assembly 12, the free distal end 6 of the cable is prone to impacting objects upon which the crane operator is applying the headache ball. Such impacts are known to fray or otherwise damage then end of the cable which impedes connection and disconnection of a socket and wedge to the cable without requiring repairs to the cable which are time consuming and difficult.

Additionally, the free distal end of the cable may be prone to catching on or damaging other structures as well as potentially injuring people who may come into inadvertent contact with the frayed end of the cable. Such catching on objects may also hang up the cable and caused a sudden deceleration to the crane cable, or shock load.

Previous attempts, including tape, brazing, or seizing it with wire to protect the free end of the cable have not been satisfactory. Such attempts have been difficult and time consuming to apply and have not prevented the free end of the cable or other components of the cable and socket and wedge assembly from catching on other objects and people.

SUMMARY OF THE INVENTION

According to a first embodiment of the present invention there is disclosed an apparatus for enclosing the free distal end of a flexible tensile member supporting an object. The flexible tensile member has a first portion in tension for suspending the object therefrom and a free end substantially perpendicular thereto with the object therebetween. The apparatus comprises a body having a passage sized to slidably receive the first portion of the flexible tensile member therein, a bottom edge adapted to engage the object and a void for enclosing the free distal end of the flexible tensile member wherein the bottom edge is engaged with the object.

The passage may be formed between a pair of opposed walls extending from the body. The pair of opposed walls may each include an end flange at a distal end thereof, the end flanges being oriented towards each other. The pair of opposed walls may be axially spaced apart from each other along the first portion of the flexible tension member. The pair of opposed walls may have a transverse gap therebetween. The gap corresponds substantially to a thickness of the flexible tension member.

The void may comprise a bore through the body. The bore may extend from the bottom edge to an opposed top edge. The bore may be tapered from the bottom edge to the top edge. The bore may have a substantially constant thickness across a plane defined by the first and second portions of the flexible tensile member and a taper in a direction along the plane.

The bottom edge may include a keeper for maintaining the bottom edge proximate to the object. The keeper may comprise a bore for receiving fastener extending under a portion of the object. The keeper may comprise a latch for engaging a portion of the object.

The body may be formed of a material selected from the group consisting of metal or plastic. The flexible tension member may comprise a cable.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
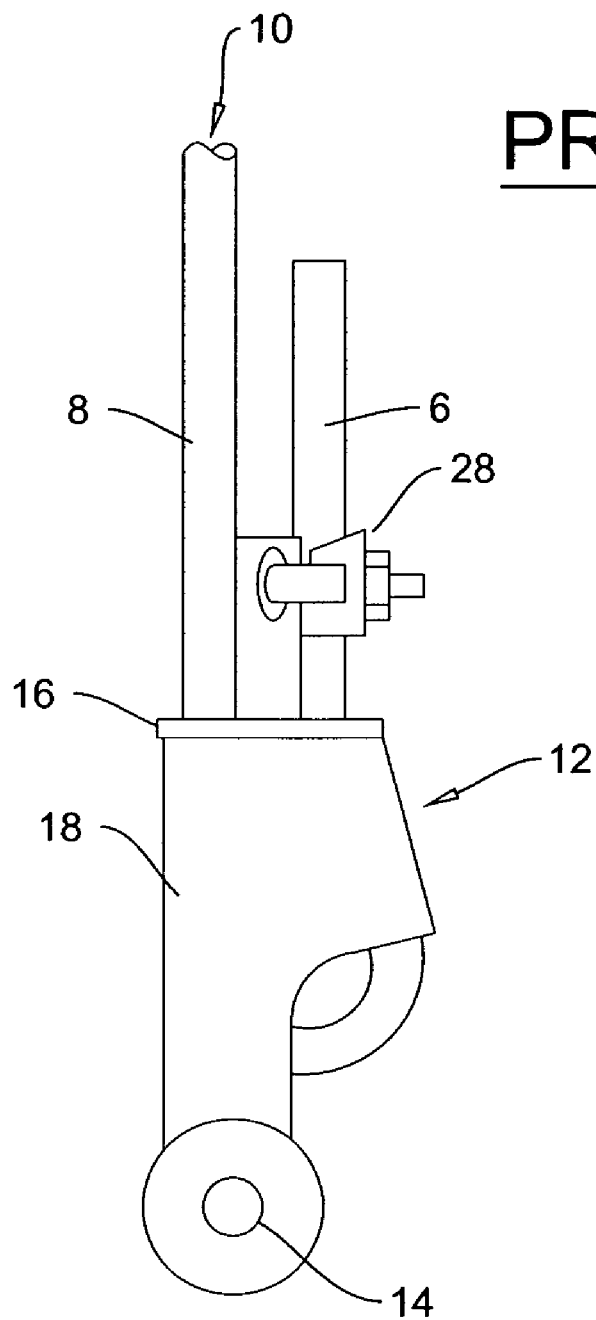
FIG. 1 is a side elevation view of a socket and wedge of the prior art assembly suspended from a cable.
Figure 2:
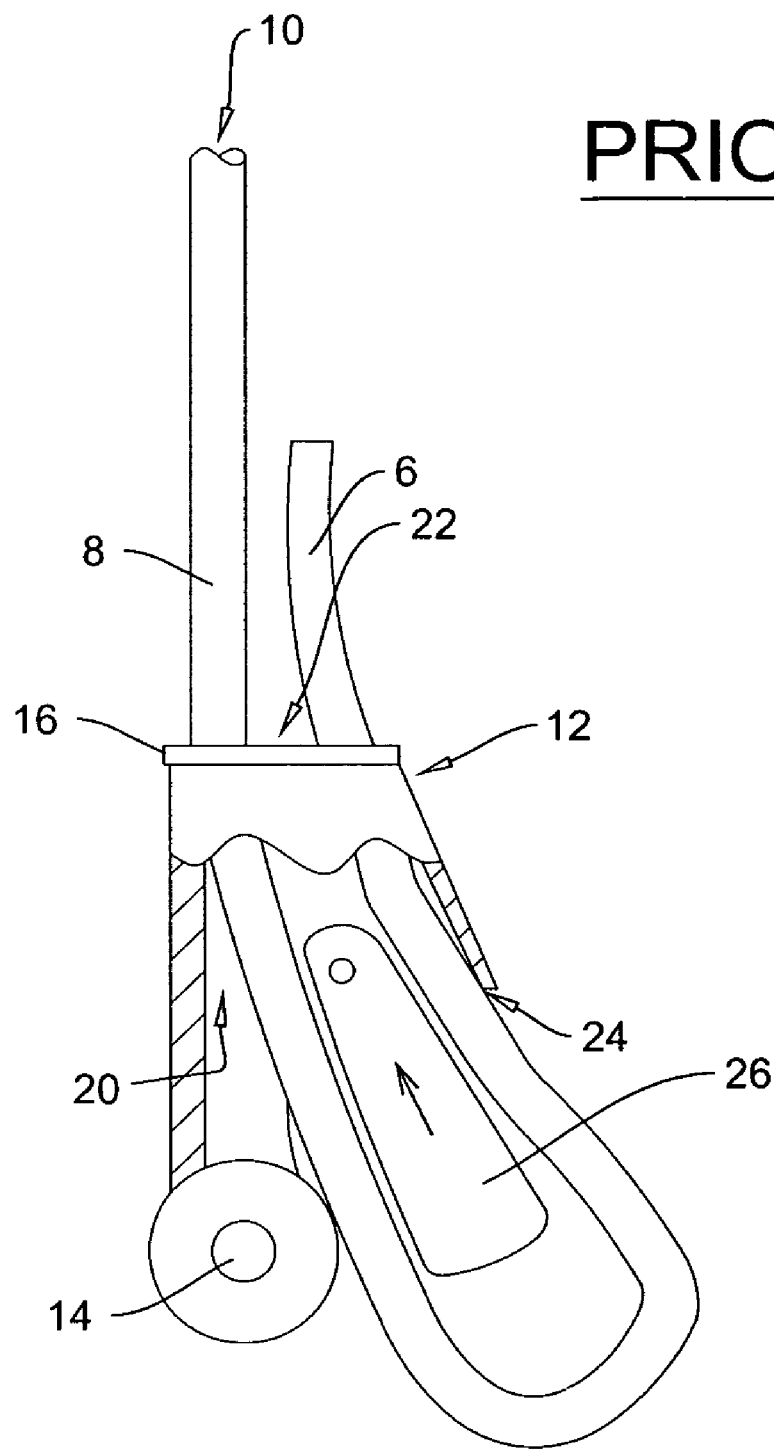
FIG. 2 is a partial cross-sectional view of the assembly of the socket and wedge of FIG. 1.
Figure 3:
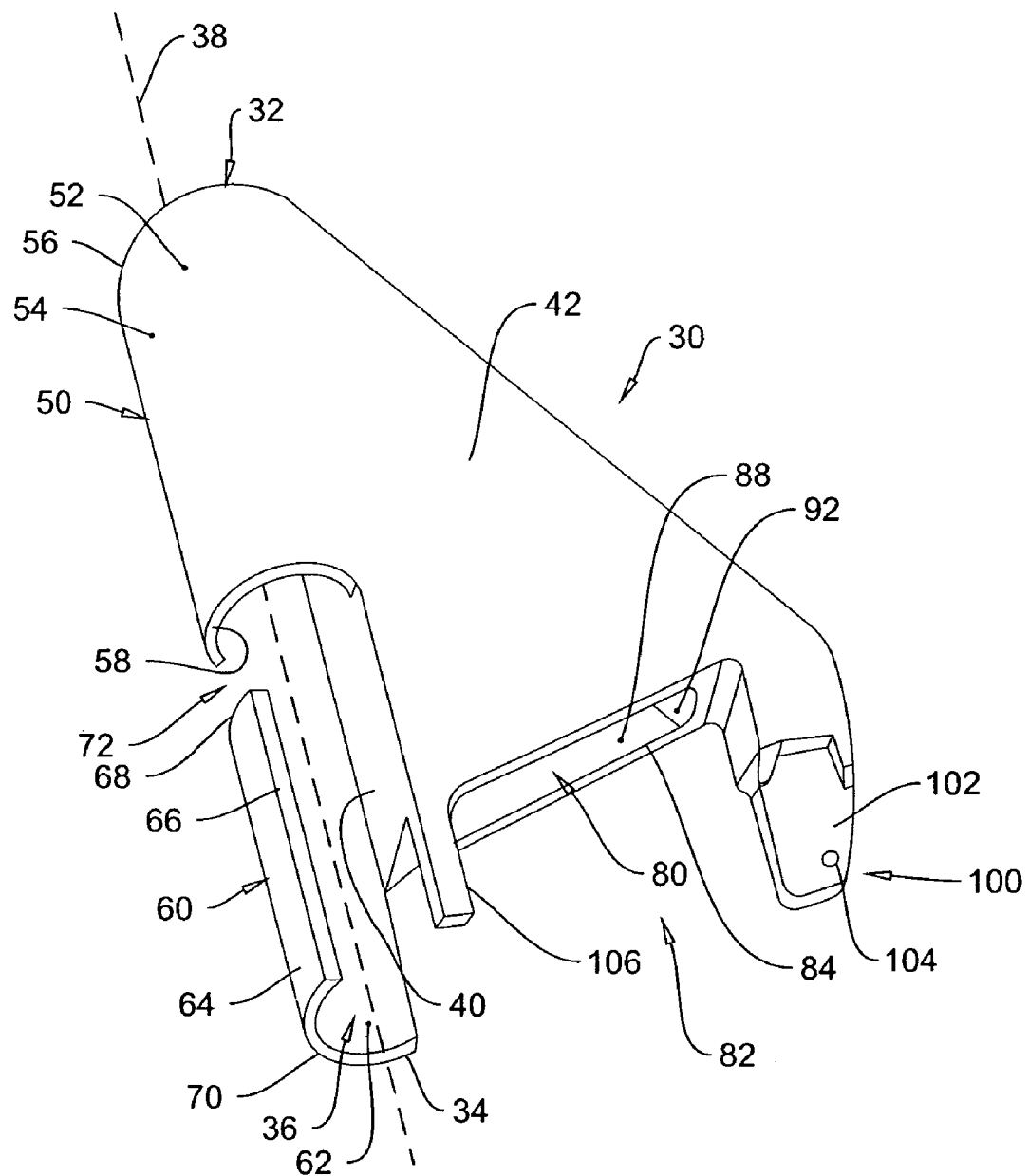
FIG. 3 is a perspective view of a cable end protector according to a first embodiment of the present invention.

Referring to FIG. 3, an apparatus according to a first embodiment of the invention for enclosing the distal end of a crane line, or end protector, is shown generally at 30. The end protector 30 comprises a body extending between top and bottom ends, 32 and 34, respectively. The end protector has a passage 36 extending along a passage axis 38 between the top and bottom ends 32 and 34 for receiving the first or load bearing portion 8 of the cable 10 and a void 80 therein for receiving the free distal end 6 of the crane cable 10.

The end protector 30 includes an edge surface 40 extending along one edge thereof between the top and bottom ends 32 and 34 and first and second side surfaces, 42 and 44, respectively. The passage 36 is defined by first and second walls 50 and 60, respectively extending from the edge surface 40. As illustrated, the second wall 60 extends from the second side surface 44 and includes a first portion 62 substantially parallel to the second side surface 44 and a second portion 64 substantially perpendicular to the first portion 62 and substantially parallel to the edge surface 40. Similarly, the first wall 50 comprises a first portion 52 extending substantially parallel to the first side surface 42 and a second portion 54 substantially perpendicular thereto. The first and second walls 50 and 60 cooperate with the edge surface 40 to retain the load carrying portion 8 of the crane cable 10 within the passage 36. As illustrated, the first portions 52 and 62 of the first and second walls 50 and 60 are continuous with the second portions 54 and 64 along a continuous arc about the passage axis 38. However, it will be appreciated that in other embodiments, the first and second portions may also be distinct from each other and will therefore form a segmented wall. In embodiments where the first and second portions are continuous, a distal edge 66 of the second portions may also extend back towards the edge surface 40. In such embodiments, the curvature of the wall, such as illustrated with reference to the second wall 60 may exceed 90 degrees as measured from parallel to the second side surface 44. In other embodiments having distinct first and second portions, the second portion may include a lip so as to assist in retaining the cable 10 within the passage 36.

The first wall 50 extends between top and bottom edges 56 and 58 and the second wall extends between top and bottom edges 68 and 70. The first and second walls 50 and 60 are spaced apart so as to form a gap 72 between the bottom edge 58 of the first wall and the top edge 68 of the second wall. Accordingly, the first and second walls 50 and 60 are spaced apart along the axis 38 of the passage. The gap 72 may be transverse or substantially perpendicular to the axis 38 as illustrated although it will be appreciate that other orientations relative to the axis 38 may be utilized as well. The gap 72 has a width sufficient for the cable 10 to pass therethrough so as to locate the cable within the passage 36 as will be more fully described below.

The first portions 52 and 62 of the first and second walls 50 and 60 cooperate to enclose the cable 10 within the passage 36. As illustrated the first and second walls 50 and 60 are located on opposed sides of the passage 36 wherein the second portions 54 and 64 are oriented towards each other.

Figure 6:
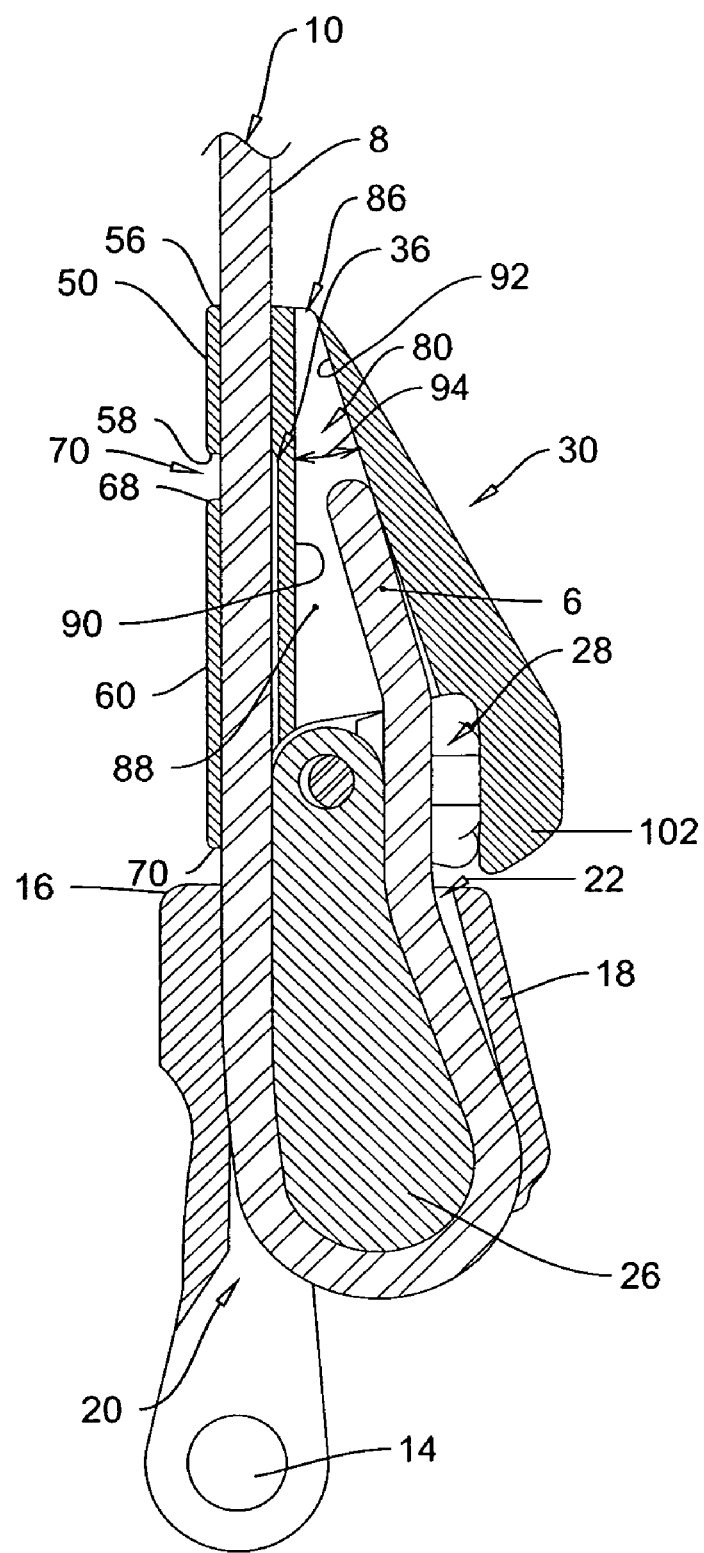
FIG. 6 is a cross sectional view of the end protector of FIG. 3 applied to the load supporting end of a crane cable adjacent a socket and wedge assembly so as to enclose and protect the free distal end of the cable.

The void 80 is sized and shaped to receive the free distal end 6 of the cable 10 as set out above. The void 80 is formed into the end protector 30 extending from the bottom end 34 thereof. As illustrated, the bottom end 34 may include a cavity 82 sized and shaped to receive a clip 28 as are known in the art therein. The void 80 extends from a bottom aperture 84 adjacent to the cavity 82 in a direction towards the top end 32 of the end protector 30. With reference to FIG. 6, the void 80 may have extend through the end protector to the top end 32 thereof so as to have an top aperture 86 therein. It will also be appreciated that in some embodiments, the void 80 may be a blind bore having no top aperture.

The void 80 is formed by a pair of spaced apart side walls 88 and first and second end walls 90 and 92, respectively. The side walls have a constant distance between them and are oriented in a direction corresponding to the first and second side surfaces 42 and 44 of the end protector although a taper may be useful in some embodiments as well. The spacing between the side walls 88 may be selected to correspond to the thickness of the cable 10 with which the end protector 30 is to be used. The first and second end walls 90 and 92 may be substantially planar or may have a curvature or any other shape as will be appreciated. The first and second end walls 90 and 92 may be angularly oriented towards each other to form a taper angle, generally indicated at 94 in FIG. 6. The taper angle 94 may be selected so as to cause the free distal end 6 of the cable 10 to bear against the second end wall 92 when the body is placed thereover so as to assist in frictionally retaining the end protector 30 on the socket and wedge assembly 12.

The end protector 30 may optionally include a keeper 100 for retaining the end protector in contact with the socket and wedge assembly 12. As illustrated in the attached Figures, the keeper 100 may comprise a tab 102 having a bore 104 therethrough sized to receive a cotter pin (not shown), or other suitable fastener. The bore 104 may be located such that a cotter pin passed therethrough engaged upon the underside of bolts of the clasp as are known in the art. Other keepers 100 may comprise a tab 106 extending from the bottom end 34 of the end protector 30 parallel to the second wall 60. The bracing tab 106 is locatable to an opposite side of the socket and wedge assembly so as to prevent the second wall from rotating out of contact with the cable 10. The bracing tab 106 may be located adjacent to the passage 36 or distally therefrom.

Figure 4:
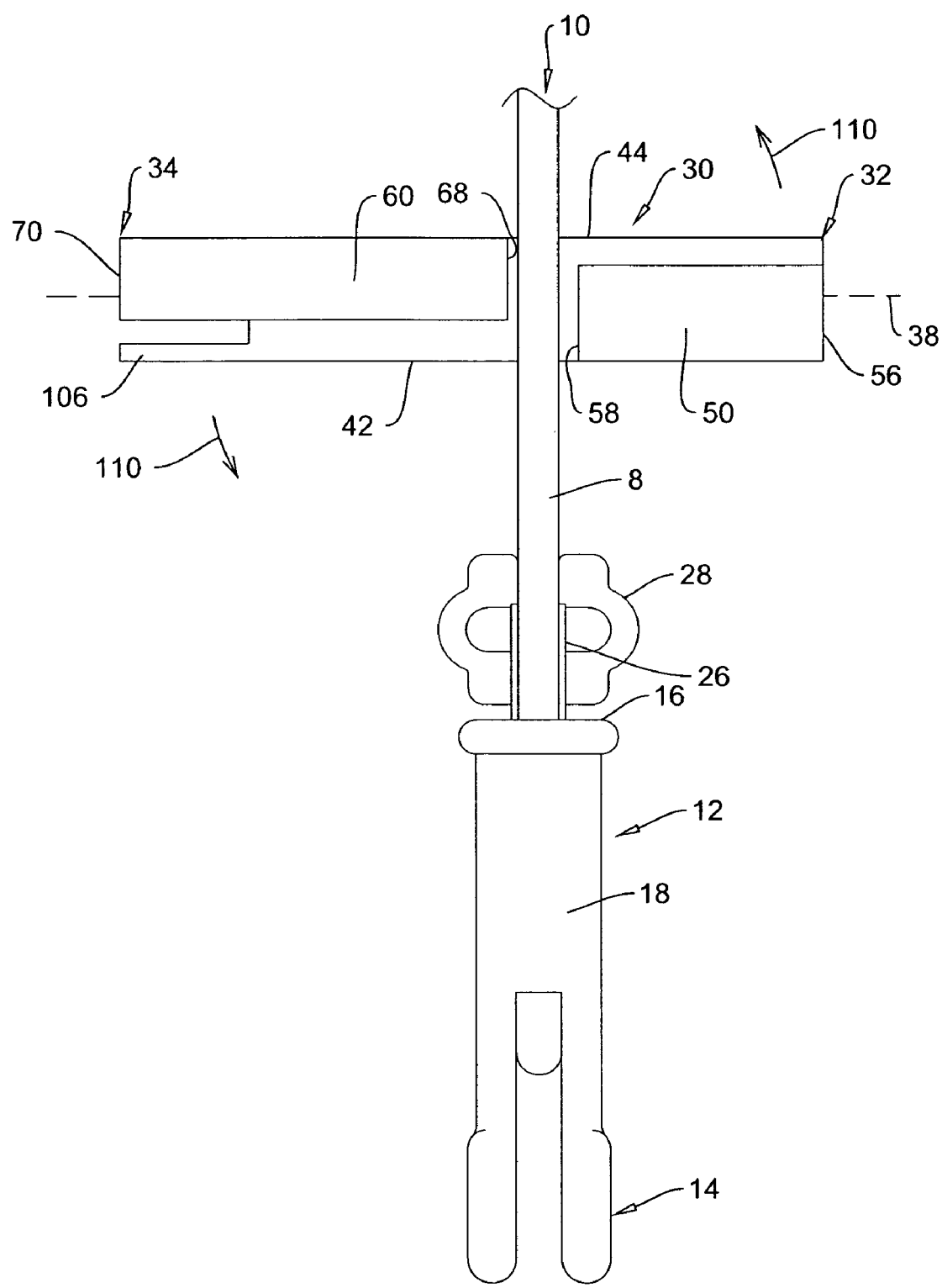
FIG. 4 is a front elevation view of the end protector of FIG. 3 being applied to a load bearing portion of a crane cable above a socket and wedge assembly.
Figure 5:
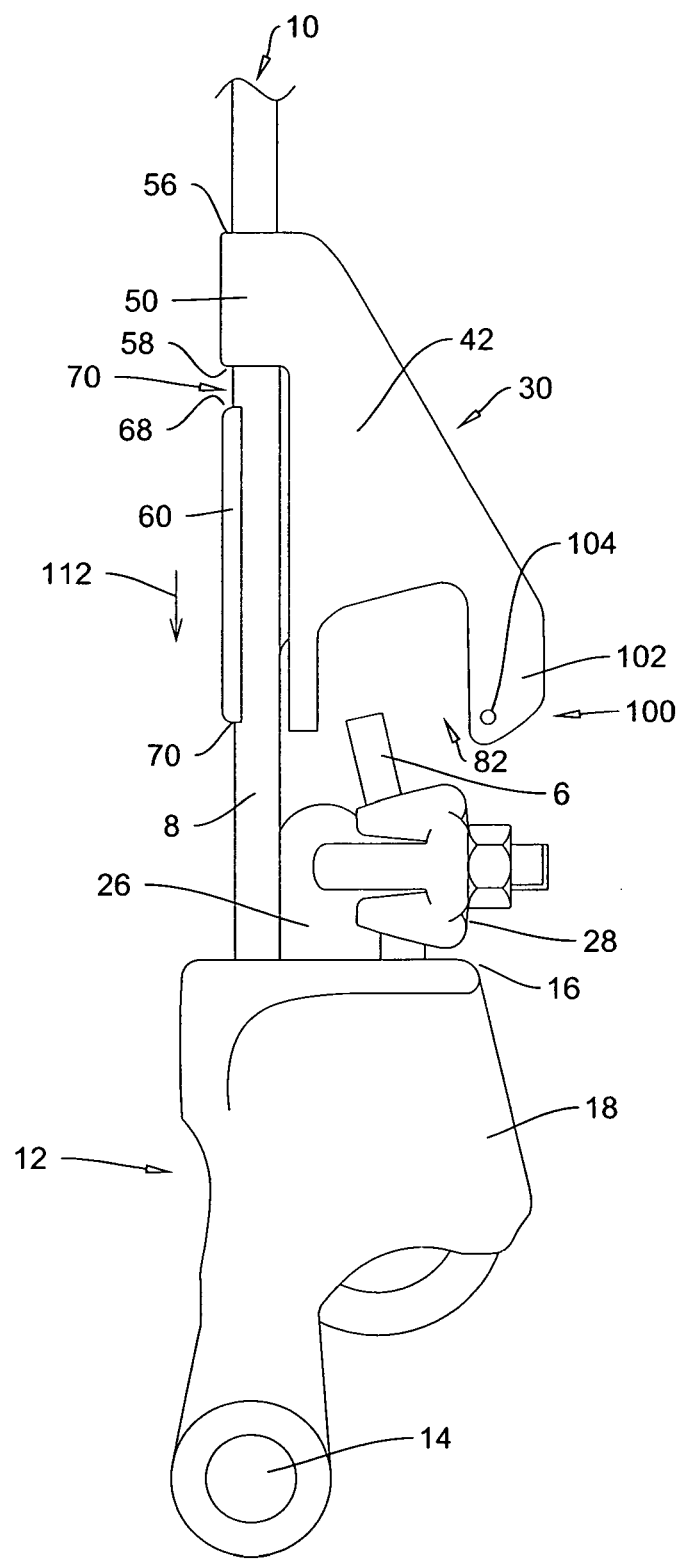
FIG. 5 is a side elevation view of the end protector of FIG. 3 applied to the load bearing portion of a crane cable above a wedge assembly.

In operation, a user may locate the gap 70 of the end protector about a load bearing portion 8 of a cable above a socket and wedge assembly as illustrated in FIG. 4. Thereafter, the end protector 30 may be rotated in a direction indicated generally at 110 to bring the first and second walls 50 and 60 into contact with the load bearing portion 8 and thereby to locate the passage 36 around the load bearing portion. The end protector 30 may then be moved in a generally downward direction indicated generally at 112 so as to locate the free distal end 6 of the cable within the void 80 as illustrated in FIG. 5.

While specific embodiments of the invention have been described and illustrated, such embodiments should be considered illustrative of the invention only and not as limiting the invention as construed in accordance with the accompanying claims.

What is claimed is:

1. An apparatus for enclosing the free distal end of a flexible tensile member supporting an object, the flexible tensile member having a first portion in tension for suspending said object from said flexible tension member and a free end substantially parallel to said first portion with said object between said first portion and said free end, the apparatus comprising a body having a passage sized to slidably receive said first portion of said flexible tensile member therein, a bottom edge adapted to engage the object and a void for enclosing said free distal end of said flexible tensile member wherein said bottom edge is engaged with the object, wherein said void comprises a bore through said body extend from said bottom edge to an opposed top edge.

2. The apparatus of claim 1 wherein said passage is formed between a pair of opposed walls extending from said body.

3. The apparatus of claim 2 wherein said pair of opposed walls each include an end flange at a distal end thereof, said end flanges being oriented towards each other.

4. The apparatus of claim 3, wherein said pair of opposed walls are axially spaced apart from each other along said first portion of the flexible tension member.

5. The apparatus of claim 4 wherein said pair of opposed walls have a transverse gap therebetween.

6. The apparatus of claim 5 wherein said gap corresponds substantially to a thickness of the flexible tension member.

7. The apparatus of claim 1 wherein said bore is tapered from said bottom edge to said top edge.

8. The apparatus of claim 7 wherein said bore has a substantially constant thickness across a plane defined by said first and second portions of said flexible tensile member and a taper in a direction along said plane.

9. The apparatus of claim 1 wherein said bottom edge includes a keeper for maintaining said bottom edge proximate to the object.

10. The apparatus of claim 9 wherein said keeper comprises a bore for receiving a fastener extending under a portion of said object.

11. The apparatus of claim 9 wherein said keeper comprises a latch for engaging a portion of said object.

12. The apparatus of claim 1 wherein said body is formed of a material selected from the group consisting of metal or plastic.

13. The apparatus of claim 1 wherein said flexible tension member comprises a cable.

* * * * *